455-600 AU 233 EX
FIP8106 XR 3,157,843
[redacted]
2
Nov. 17, 1964 R. E. KONCEN 3,157,843
SOLID STATE MODULATOR FOR PHOTOTRANSISTORS
Filed Feb. 28, 1962
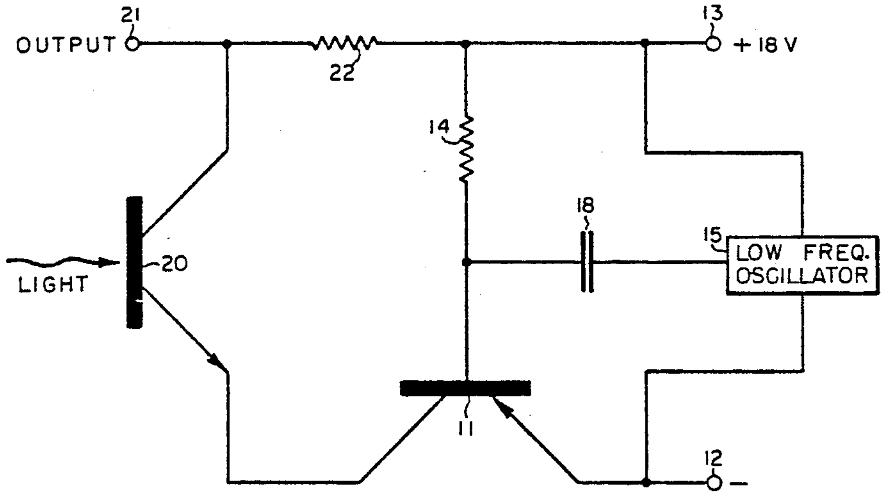
INVENTOR
RAYMOND E. KONCEN
C. E. Vautrain Jr., Agent
BY Richard C. Reed
ATTORNEY United States Patent Office 3,157,843

Patented Nov. 17, 1964

3,157,843

SOLID STATE MODULATOR FOR PHOTO-TRANSISTORS

Raymond E. Koacen, Oxon Hill, Md.
(5690 Bock Terrace SE., Washington 21, D.C.)

Filed Feb. 28, 1962, Ser. No. 176,457
7 Claims. (Cl. 332—31)
(Granted under Title 35, U.S. Code (1952), sec. 266)

The invention described herein may be manufactured and used by or for the Government of the United States of America for governmental purposes without the payment of any royalties thereon or therefor.

This invention relates in general to modulators and more particularly to a novel electronic modulator.

The conventional method of providing a modulated signal at low frequencies is by mechanically interrupting light rays incident upon a photoelectric cell, for example, by chopper disc. The use of such a chopper disc has several disadvantages among which are speed, being not precisely accurate, bearing fatigue of the source of rotary power, and high current drain. The requirement of an electric motor to drive the chopper disc alone provides an undesirable feature in space utilization. In a device where space and power are critical and must be used with the greatest efficiency the electric motor and its attendant power consumption are highly undesirable. A further disadvantage is the possibility of personal injury attendant with use of an electric motor and attached chopper disc.

Accordingly, it is an object of the present invention to provide a solid state modulator which requires a minimum amount of space.

It is another object of the present invention to provide a solid state modulator which does not utilize a significant amount of power to provide desired modulation.

It is a further object of the present invention to provide a solid state modulator, having no moving parts.

A still further object of the present invention is to provide an electronic modulator for use with phototransistors.

Other objects and many of the attendant advantages of this invention will be readily appreciated as the same becomes better understood by reference to the following detailed description when considered in connection with the accompanying drawing which depicts a circuit using a switching transistor 11 as an electric switch. The electric switch is used to perform the same function as a mechanical interrupting chopper disc. A D.C. power supply is connected across input terminals 12 and 13 which are connected, respectively, to the emitter electrode of transistor 11 and the base electrode of transistor 11. A biasing resistor 14 is inserted in series with the base electrode and in parallel with a modulation input, i.e., low frequency oscillator 15. The modulation input is fed to the base of transistor 11 through D.C. blocking capacitor 18. The collector electrode of transistor 11 is connected to the emitter electrode of phototransistor 20, while the collector electrode of phototransistor 20 is connected to the output terminal 21 in parallel with dropping resistance 22 which in turn is connected to the base electrode of transistor 11 and input terminal 13.

In the operation of the present invention a light source of varying intensity, indicated by the rays of light directed toward phototransistor 20, causes a slowly varying D.C. output at output terminal 21 which varies as the intensity of the projected light varies. It is well understood in the art that such a D.C. signal at output 21, to be useful, and, to be receptive to high gain amplification without instability, must be converted to an A.C. signal. Such conversion is accomplished by switching transistor 11 having its collector electrode connected to the emitting electrode of phototransistor 20. The A.C. signal is derived from low frequency oscillator 15 and is applied to switching transistor 11 through D.C. blocking capacitor 18 to modulate the output of the switching transistor. The output of switching transistor 11 is in turn applied to phototransisor 20 to modulate the output of the phototransistor. The phototransistor output signal is thereby modulated at the same frequency as oscillator 15, with the amplitude of the A.C. signal thus generated proportional to the light intensity falling upon the phototransistor 20. The output at 21 which initially was a slow varying D.C. signal and which has now been converted to an A.C. signal with the A.C. signal modulated proportionally to the light intensity impressed on the phototransistor, is the A.C. amplitude which can be recorded or used as a control function for other circuits or equipment.

The low frequency oscillator 15 may be a multivibrator, a sine wave oscillator, a square wave oscillator, a sawtooth oscillator or any low frequency oscillator capable of producing the desired frequency to modulate switching transistor 11. Low frequency oscillator 15 is shown connected to the power supply of the circuit, however, it is understood that it may be powered from a separate power supply within the concept of this invention.

In summary, it has been shown that the present invention provides solid state modulation of D.C. voltage in a novel and advantageous manner whereby an alternating output is obtained through means which require very little energy to operate and occupy a minimum of space. The present invention eliminates many components including an electric motor and its mounting, electrical connections, a light chopper disc, and the connection between motor and disc in conventional devices. It also uses much less current than such a motor and provides a switching means which operates in a completely separate and distinct manner from prior photocells and switching transistors.

Obviously many modifications and variations of the present invention are possible in the light of the above teachings. It is therefore to be understood that within the scope of the appended claims the invention may be practiced otherwise than as specifically described.

What is claimed is:

1. A solid state circuit for modulating a D.C. supply to provide an A.C. signal to a phototransistor and to provide an A.C. output signal whose amplitude is proportional to the intensity of the light impinging upon the phototransistor comprising a phototransistor adapted to have its photosensitive area illuminated by light, said phototransistor having at least emitter and collector electrodes, transistor switching means having an output connected to the emitter elecrode of said phototransistor, and electronic oscillating means connected across said D.C. supply and adapted to modulate said D.C. supply at a selected frequency, said modulated supply being connected to and actuating said transistor switching means with said transistor switching means and electronic oscillating means providing an A.C. signal to said phototransistor whereby the output signal of the solid state circuit is an A.C. signal whose amplitude is proportional to the intensity of the light impinging upon the phototransistor.

2. The device claimed in claim 1 wherein said electronic oscillating means is a multivibrator.

3. The device claimed in claim 1 wherein said electronic oscillating means is a sawtooth oscillator.

4. A solid state circuit for modulating a D.C. supply to provide an alternating signal to a D.C. output of a phototransistor comprising electronic oscillating means connected across said D.C. supply, semiconductor switching means also connected across said D.C. supply, said switching means having emitter, base and collector electrodes, said base electrode connected to the output of said electronic oscillating means whereby said semiconductor is made conducting or non-conducting in response to the frequency of said oscillating means, the base and emitter electrodes of said semiconductor connected across said D.C. supply, and a phototransistor having at least emitter and collector electrodes, the emitter electrode of said phototransistor connected to the collector electrode of said semiconductor and the collector electrode of said phototransistor being the output of the circuit, with said D.C. output of said phototransistor being converted to an A.C. signal whereby said A.C. signal has an amplitude which varies in proportion to the intensity of the light impinging on the phototransistor.

5. The device claimed in claim 4 wherein said electronic oscillating means is a square wave oscillator.

6. A circuit for modulating a D.C. supply to provide an amplified alternating signal to a phototransistor comprising electronic oscillating means connected across said D.C. supply, semiconductor amplifying means connected across said D.C. supply, said amplifying means having emitter, base and collector electrodes, said base electrode connected to the output of said electronic oscillating means whereby said semiconductor is made conducting or non-conducting in response to the frequency of said oscillating means, the base and emitter electrodes of said semiconductor connected across said D.C. supply, and a phototransistor having at least emitter and collector electrodes, the emitter elecrode of said phototransistor connected to the collector electrode of said semiconductor and the collector electrode of said phototransistor being the output of the circuit, with said output providing a signal varying in amplitude in proportion to the light intensity impressed upon said phototransistor.

7. The device claimed in claim 6 wherein said electronic oscillating means is a multivibrator.

References Cited by the Examiner

UNITED STATES PATENTS

| | | | |
|---|---|---|---|
| 2,914,665 | 11/59 | Linder | 250—199 |
| 3,022,465 | 2/62 | Slenker et al. | 332—31 X |
| 3,040,262 | 6/62 | Pearson | 250—211 X |

OTHER REFERENCES

Kenn et al.: Radio & Television News, May 1954 (pages 52, 53).

RALPH G. NILSON, *Primary Examiner.*

WALTER STOLWEIN, *Examiner.*